(12) United States Patent
Kearns

(10) Patent No.: US 12,003,212 B2
(45) Date of Patent: Jun. 4, 2024

(54) SELF-BALLASTED PRE-ENGINEERED MODULAR PLATFORM ASSEMBLED ONSITE FOR GENERATING ELECTRICITY WITH BIFACIAL PHOTOVOLTAIC MODULES

(71) Applicant: Lawrence Kearns, Oak Park, IL (US)

(72) Inventor: Lawrence Kearns, Oak Park, IL (US)

(*) Notice: Subject to any disclaimer, the term of this patent is extended or adjusted under 35 U.S.C. 154(b) by 0 days.

(21) Appl. No.: 18/082,867

(22) Filed: Dec. 16, 2022

(65) Prior Publication Data

US 2023/0208352 A1    Jun. 29, 2023

Related U.S. Application Data

(60) Provisional application No. 63/294,464, filed on Dec. 29, 2021.

(51) Int. Cl.
*H02S 40/22* (2014.01)
*H02S 20/10* (2014.01)
*H02S 30/10* (2014.01)

(52) U.S. Cl.
CPC ............. *H02S 40/22* (2014.12); *H02S 20/10* (2014.12); *H02S 30/10* (2014.12)

(58) Field of Classification Search
CPC .................................................... H02S 40/22
See application file for complete search history.

(56) References Cited

U.S. PATENT DOCUMENTS

| | | | |
|---|---|---|---|
| 2010/0212715 A1* | 8/2010 | Almy | H02S 20/00 136/251 |
| 2016/0001691 A1* | 1/2016 | Andretich | H02S 20/10 280/475 |
| 2018/0034408 A1* | 2/2018 | Julian | H01L 31/02008 |
| 2019/0158013 A1* | 5/2019 | Boguess | H02S 30/10 |
| 2019/0190443 A1* | 6/2019 | Kutzer | H02S 40/22 |
| 2019/0190445 A1* | 6/2019 | Alderman | H02S 20/32 |
| 2020/0266754 A1* | 8/2020 | Ferris | F24S 25/634 |
| 2021/0058022 A1* | 2/2021 | Forrest | H02S 40/22 |
| 2022/0060140 A1* | 2/2022 | Attal | H02S 10/00 |
| 2022/0069767 A1* | 3/2022 | Graner | H02S 40/42 |

* cited by examiner

*Primary Examiner* — Bethany L Martin
(74) *Attorney, Agent, or Firm* — Scale LLP

(57) ABSTRACT

The present disclosure provides a self-ballasted, pre-engineered modular platform for deployable solar installations including one or more photovoltaic modules, one or more tables to support the photovoltaic modules, one or more reflectors, and a base configured to support the one or more reflectors at a first position proximate a ground surface, and to support the one or more tables at an elevated relative to the one or more reflectors. In some examples, multiple modular platforms may be connected to provide a single electrical output. In some examples, the modular platform is assembled onsite for generating electricity with bifacial photovoltaic modules.

16 Claims, 14 Drawing Sheets

SELF-BALLASTED PRE-ENGINEERED MODULAR PLATFORM ASSEMBLED ONSITE FOR GENERATING ELECTRICITY WITH BIFACIAL PHOTOVOLTAIC MODULES

RELATED APPLICATIONS

The present application claims the benefit of, and priority to, U.S. Provisional Application No. 63/294,464, filed Dec. 29, 2021, entitled "A Self-Ballasted Pre-Engineered Modular Platform Assembled Onsite For Generating Electricity With Bifacial Photovoltaic Modules." The complete subject matter and contents of App. Ser. No. 63/294,464 are incorporated herein by reference in their entireties.

BACKGROUND

Constructing utility-scale solar farms requires sophisticated, knowledgeable owners who rely on professional consultants and workers to deploy ground-mounted technology. If located on working lands, landowners must take the fields out of cash crop production. Solar farms constructed in this manner are complex, costly, and can accommodate a limited size of livestock for animal grazing, such as sheep.

To minimize the time and effort required to build solar farms on various types of land, including working lands, new methods of assembly and hardware are needed to expand the adoption of clean energy.

SUMMARY

Disclosed are systems and methods for pre-engineered, self-ballasted modular platforms, agnostic to ground preparation and subsurface conditions, configured to host prefabricated tables of bifacial solar panels, which connect with cables in the field to operate as a solar farm. At an onsite staging area, cranes lift prefabricated components delivered by one or more vehicles (e.g., flatbed semitrailers, containers, etc.) into positions on level ground where the components are connected, such as with mechanical, pneumatic and/or hydraulic tools. The components are connected with fasteners, such as lockbolts, which are resistant to vibration, environmental exposure, etc. After assembly of the modular platforms, working vehicles, including tractors, tow or otherwise move the modular platforms to a deployment area, such as a field, arranging them in columns, rows, and/or other spatial arrangements. Platforms are assembled and towed into position until they complete the solar farm with a desired number of modular platforms (e.g., over a matter of days or weeks).

In the field, the tables of one platform are connected to another (e.g., in the same column) to complete a string of photovoltaic modules. The cables are then extended to a shared conduit, overhead path, or tray (e.g., in a transverse aisle). There, string cables are connected from each modular platform in parallel to an array cable, which connects with cables to a central power converter, such as an inverter, tied to a power grid or off-grid loads (e.g., an energy storage device, a clean power plant, a power delivery system, etc.).

The modular platforms allow landowners without sophisticated knowledge to build solar farms on their property, including agricultural lands that can remain productive (e.g., as grazing land). With the electricity generated by the solar farm, farmers and ranchers will be able to provide all the energy needed to run a carbon-free operation, including the necessary power to generate hydrogen and ammonia, which they can use as diesel alternatives and/or fertilizer.

These and other features and advantages of the present invention will be apparent from the following detailed description, in conjunction with the appended claims.

BRIEF DESCRIPTION OF THE DRAWINGS

The benefits and advantages of the present invention will become more readily apparent to those of ordinary skill in the relevant art after reviewing the following detailed description and accompanying drawings, wherein.

Figure 1:
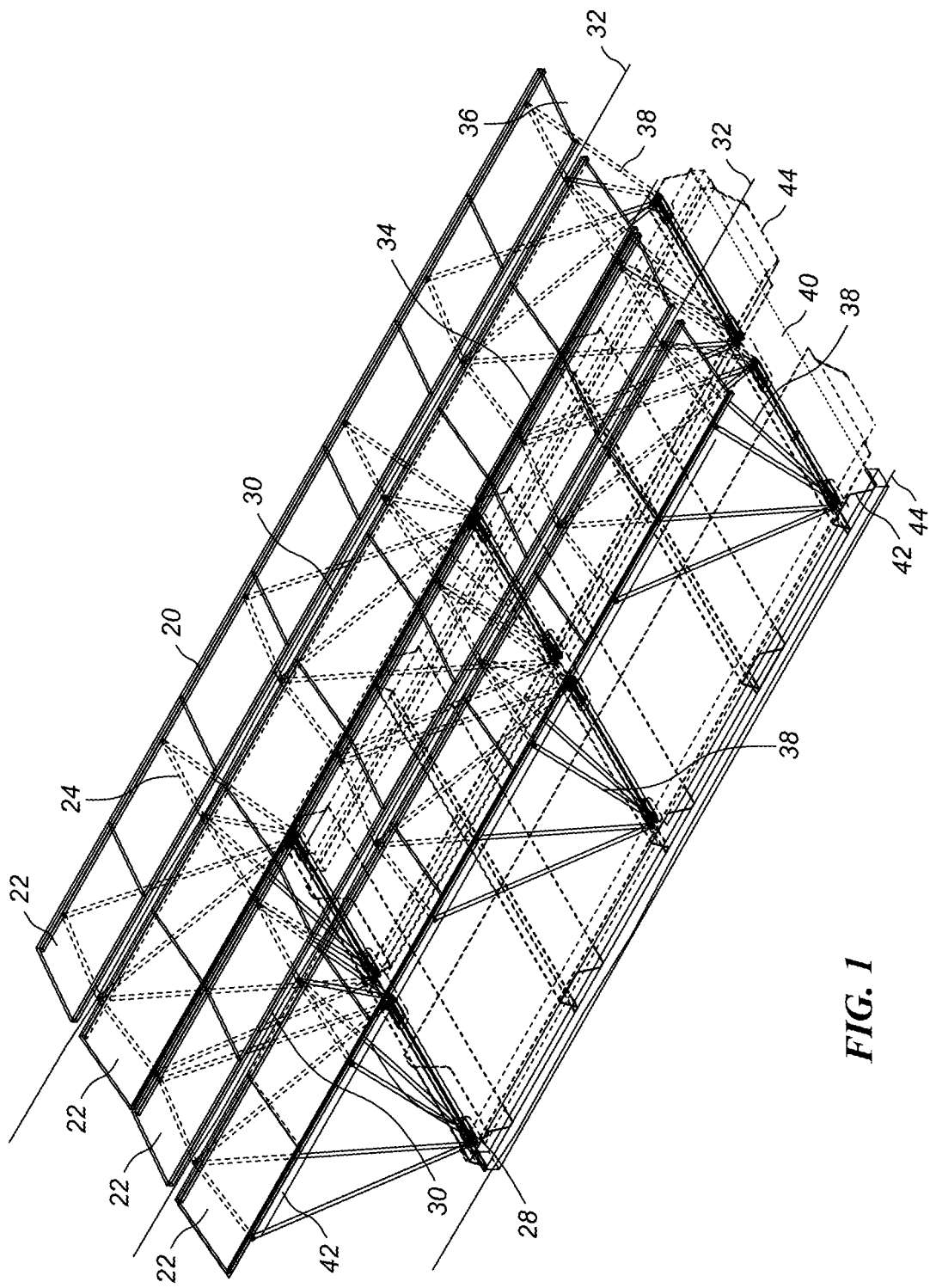
FIG. 1 schematically illustrates an example platform with an internal gutter seen above in an isometric view, in accordance with aspects of this disclosure.
Figure 1A:
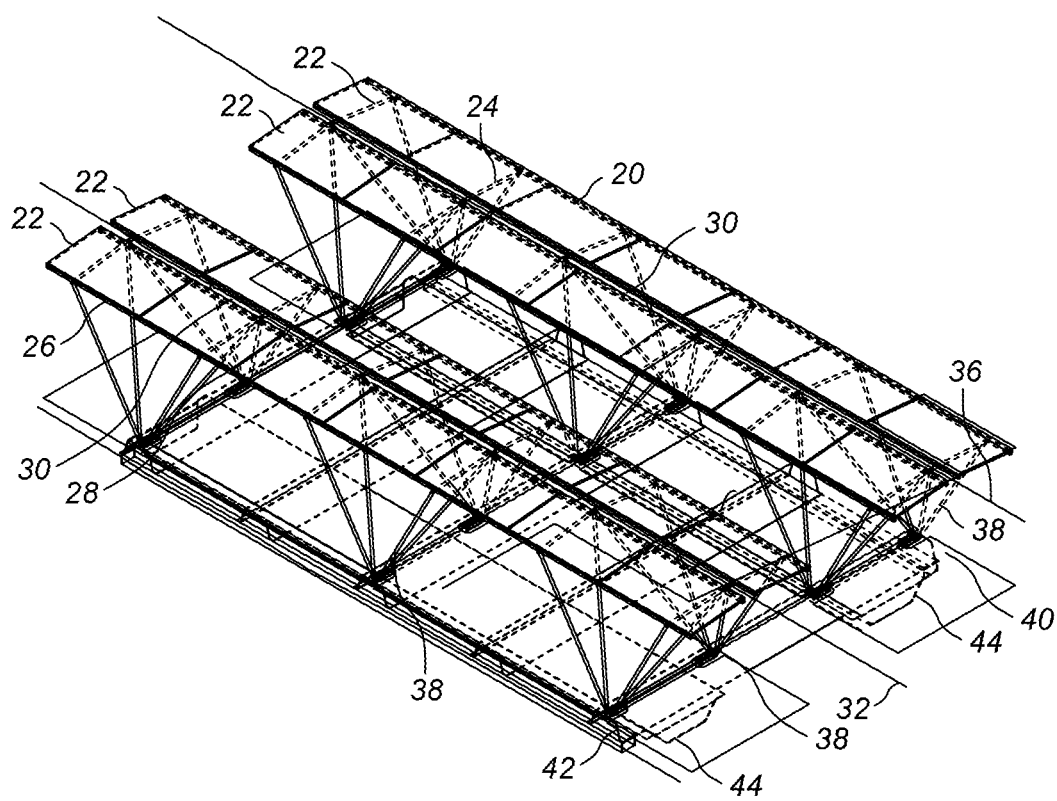
FIG. 1a illustrates an example widened platform without an internal gutter seen from above, in accordance with aspects of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

The figures are not necessarily to scale. Where appropriate, similar or identical reference numbers are used to refer to similar or identical components.

REFERENCE NUMERALS

20 Platform
22 Table
24 Photovoltaic Module
26 Purlin
28 Lifting Lug
30 Cable Tray
32 Fused String Cable
34 Gutter
36 Rake
38 Diagonal Strut Frame
38a Diagonal Strut Frame Foot
39 Cable Stays
40 Reflector
42 Stretcher
43 Reusable Bow
44 Runner
45 Ballast, water storage, or planting trough
46 Fused Array Cable with integrally grounded cable management
47 Reinforced Holes
48 Platform Under Assembly
50 Working Land
52 Road
54 Distribution Power Lines
56 Grazing Paddock
58 Staging Area
60 Skid-mounted Central Inverter Station
62 Grid Interconnection
64 Crane
66 Flatbed Trailer
68 String of Photovoltaic Modules
69 Bonding Jumper
70 Nested Runners
72 Nested Tables
74 Nested Stretchers
76 Racked Diagonal Struts

DETAILED DESCRIPTION

The present disclosure provides a modular platform for deployable solar installations including one or more photovoltaic modules, one or more tables to support the photovoltaic modules, one or more reflectors, and a base configured to support the one or more reflectors at a first position proximate a ground surface, and to support the one or more tables at an elevated relative to the one or more reflectors. In some examples, multiple modular platforms may be connected to provide a single electrical output.

Constructing conventional utility-scale solar farms requires sophisticated, knowledgeable owners who rely on professional consultants and crew to deploy solar arrays, such as ground-mounted solar collection technology. If located on working lands, landowners must take the fields out of cash crop production. After the landowner hires crews to survey the land and conduct geotechnical tests of subsurface conditions, contractors construct rows and columns of ground-mounted solar arrays or single-axis solar trackers mounted on piles driven permanently into the ground. Crews assemble the arrays and trackers by hand from hundreds of components transported to the field. Solar farms constructed in this manner often require large spaces, and must be constructed in a contiguous fashion, thus eliminating such fields for planting and/or large animal grazing.

Some solar farming includes an apparatus for mounting solar panels to an open face of a ballasted enclosure resting on the ground, rendering it vulnerable to snow cover. The ballasted enclosures are vulnerable to environmental conditions, such that they cannot accommodate bifacial photovoltaic modules able to generate energy on both sides of the solar panel.

Some solar farming includes ground-mounted photovoltaic arrays or trackers supported on posts anchored to concrete ballast resting on the ground. Some solar farming includes folding racks of photovoltaic modules, delivered by trucks, lifted into permanent locations by a mobile crane. Similar to installations with permanent foundations, crews must pour the concrete ballast of these systems at each post location or precast it offsite and transport it to each post location. Thus, the installations cannot be moved, and take the fields out of other productive uses.

Some solar installations include prefabricated assemblies of photovoltaic panels and supports designed to move with forklifts, which are impractical for unpaved ground, including working lands. One variation includes skid-mounted assemblies of solar panels and electrical cabinets that fasten to the ground with penetrating anchors. Another variation includes racks of photovoltaic modules hinged on central support beams. After moving the assembly with a forklift, crews support the ends of the support beam with metal legs that fasten to the ground with penetrating anchors.

Each of the described conventional systems requires sophisticated installers and specialized machinery that may not be available to or reasonable for a landowner to acquire and/or operate. Further, the installations are fixed and/or require permanent foundations that makes repurposing of the field in use impractical.

As disclosed herein, modular platforms for field-deployed solar installations are disclosed that offer straightforward manufacturing, packaging, transport, assembly and deployment. The modular platforms allow for simple scaling or expansion of the solar installation, and provides easy connection to transmit, store, and/or consume the energy generated therefrom. Beneficially, the field in which the modular platforms are deployed retain some useful space between, the size and shape of which can be adjusted to suit the needs of the landowner.

Figure 2:
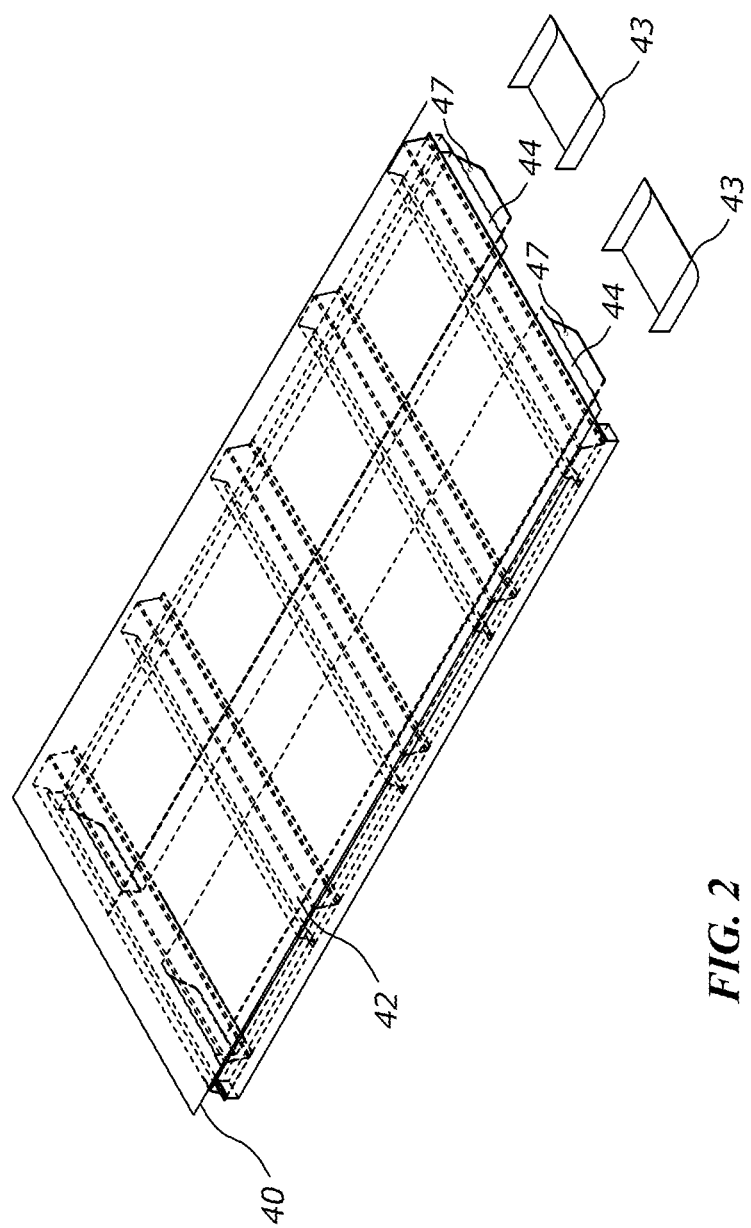
FIG. 2 schematically illustrates an example platform with an internal gutter seen below in an isometric view, in accordance with aspects of this disclosure.

An example modular platform 20 is illustrated in FIG. 1 (providing a top view) and FIG. 2 (providing a bottom view with the solar paneling removed for clarity). As shown in FIG. 1, platform 20 comprises two gabled halves, joined with an optional gutter 34 for collecting rainwater. Without the gutter 34, the space between the two halves can widen in other embodiments for a broader base. Each gabled half consists of two prefabricated tables 22 of bifacial photovoltaic modules 24 oriented in landscape position at slope optimizing east-west energy production. The tables 22 join at the gable ridge with a cable tray 30, which supports prefabricated electrical cables 32 that connect to cables (e.g., pre-manufactured and/or field installed) of the bifacial photovoltaic modules 24 at one or more locations along each table 22 (e.g., at an end).

In some examples, steel purlins 26, with C-shaped or Z-shaped sections, comprise the long sides of the prefabricated tables 22. At the short side of the prefabricated tables 22, rake members 36 connect the purlins 26 to complete a structural frame. In some examples, lifting lugs 28, located at various locations along the length of the purlins 26, provide rigging points for a crane or other machinery to lift the prefabricated tables 22.

During prefabrication, the long sides of bifacial photovoltaic modules 24 attach to purlins 26 with angles and lockbolts sized for replacement in the field with hand tools. The factory cables of adjacent interior modules 24 connect in series before being secured to the purlin 26. The loose factory cable at end modules 24 secures temporarily to rake member 36 for transport. When installed in the field, each loose factory cable will connect to a counterpart to complete a string or to a prefabricated electrical cable 32.

Figure 3:
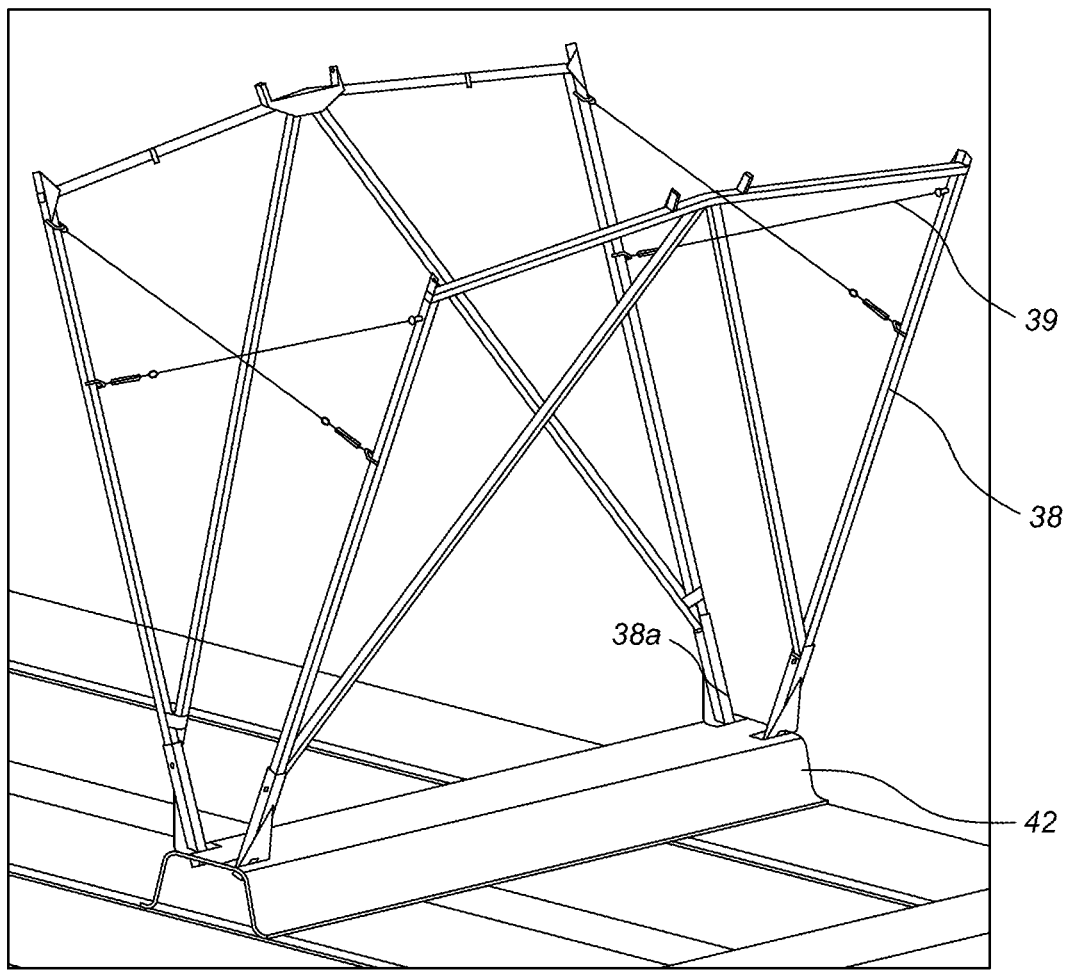
FIG. 3 illustrates an example diagonal strut frame subassembly, in accordance with aspects of this disclosure.
Figure 4:
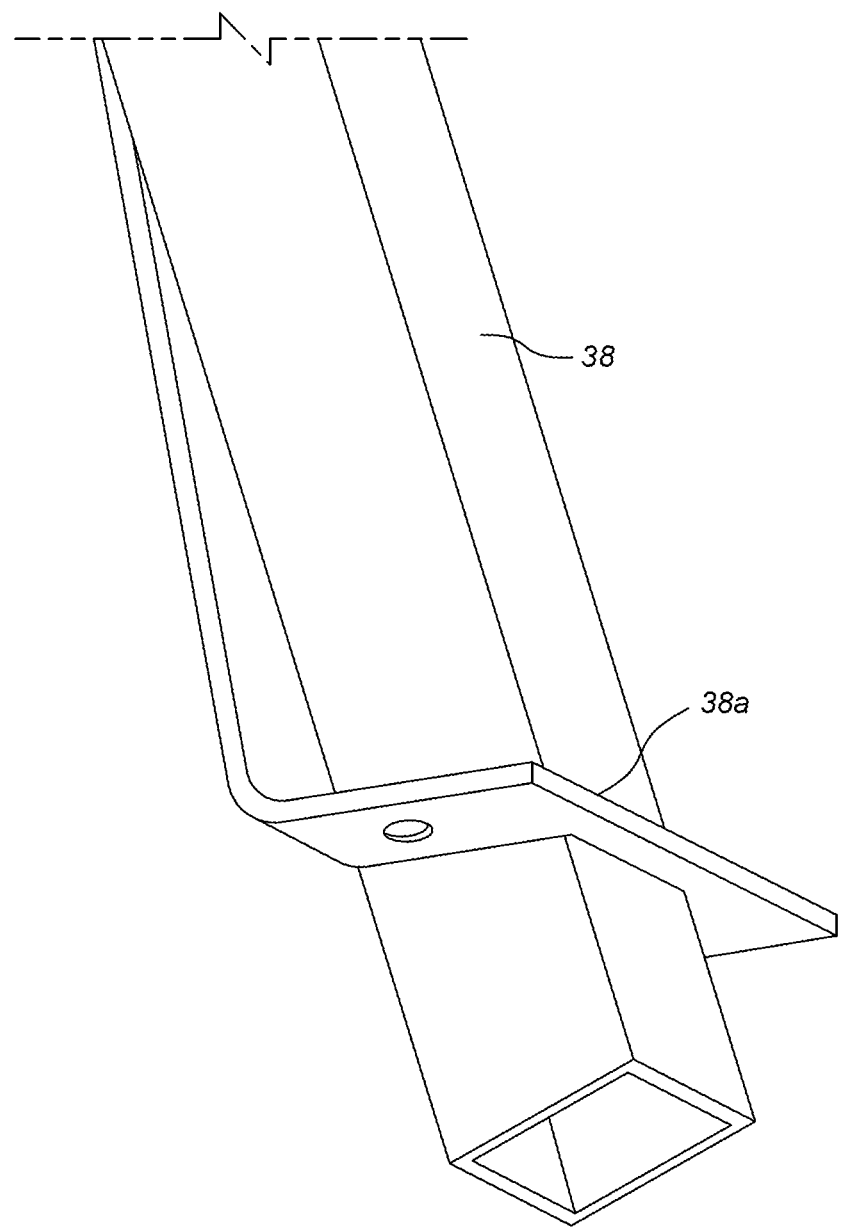
FIG. 4 illustrates a foot of the example diagonal strut frame assembly of FIG. 3, in accordance with aspects of this disclosure.

At multiple points (e.g., two or more, such as six) located along each purlin 26, each gabled half connects to the top member of one or more pairs (e.g., three) of prefabricated diagonal strut frames 38 with lockbolts and spacers. As shown in FIG. 3, each diagonal strut frame 38 consists of coplanar welded steel square or round tubes triangulated for rigidity, supported on two feet 38a. As shown in FIG. 4, each foot 38a comprises a support, such as a bent trapezoidal steel plate, welded or otherwise fastened to the steel tube frame. One or more holes in the lower half of the bent plate provide for fastening with lockbolts.

As shown in FIG. 2, the bottom of runners 42 afford a broad stable base for the platform, an electrical ground path, and affords the possibility of incorporating ballast, water storage, or planting troughs 45 within the tub girder above. Viewed from above with the solar cells and supports removed, the reflecting plate 40 is shown resting on runners 42.

The ends of the runners 44 can be rolled upward or include a segmented lip to prevent plowing during towing. Reinforced holes 47 at the ends of both longitudinal runners 44 provide rigging points for towing operations, which can include a reusable bow 43 to prevent plowing. For example, the bow 43 can be a removable structure configured to mount to the end of the runners 44 (e.g., by compression, fastening, etc.), and provide an angled ending that facilitates dragging the system across a variety of surface types.

As shown in FIG. 3, each pair of diagonal strut frames 38 may be configured to rotate from vertical to form a V, balanced by the weight of its counterpart held in place by tension cable stays 39 that crisscross or otherwise span from the sides of each strut frame 38.

One or more lateral stretchers 42 are arranged to orthogonally overlap two longitudinal runners 44 below at equal spacing. Each pair of diagonal strut frames 38 attach to the top of the middle and end lateral stretchers 42 with two lockbolts per foot.

The longitudinal runners 44, which rest on the ground, comprise steel plate tub girders, which may be fabricated by press brakes from plate steel, with tapered sides, a flat bottom, and/or flat extended flanges at the top of both sides. In some additional or alternative examples, the longitudinal runners can be fabricated from two zee-shaped sheet piles, which can be cold-rolled and joined (e.g., welded, riveted, fastened, etc.) at the seam between the piles. The lateral stretchers 42 comprise steel tub girders fabricated by press brakes from plate steel with tapered sides, a flat top, and flat extended flanges at the bottom at both sides. The corners of all steel plate tub girders can be radiused.

At the sides of the platform, the lateral stretchers 42 cantilever beyond the longitudinal runners 44. At each location where the flanges of the lateral stretchers 42 overlap the flanges of the longitudinal runners 44, lockbolts connect the flanges through aligned prefabricated holes.

Perimeter grommets of a porous synthetic material and/or fabric reflector 40 connect to posts at the end of each lateral stretcher 42, tensioning the reflector 40 taut above the lateral stretchers 42. A retaining pin secures the grommets of the reflector 40 to each post. The loose ends of the reflector 40 can tension to neighboring ones in the field with cables. In some examples, the reflector 40 is placed above the lateral stretchers 42, without stretching the reflector itself. For instance, reflectors can be substantially flat, rigid, and/or with a fixed shape or geometry, and can be placed atop the lateral stretchers in a manner to reflect incident light toward the bifacial photovoltaic cells. Any suitable reflector can then be fastened to the structure by bolting, welding, rivets, tension cords, or other reasonable fastening means.

Components fabricated from plate or tube steel including stretchers 42, runners 44, diagonal strut frames 38 can be hot-dipped galvanized to extend their service life. Zinc-coated fasteners, including lockbolt fasteners, consisting of a grooved metal pin and swaged metal collar, clamp components together with force to withstand vibrations, caused by movement of the system from wind, water, grazing animals, machinery, etc.

Although illustrated as two portions separated by an optional gutter 34, in some examples a modular platform may include a single portion, and in some examples the modular platform may include three or four or more such portions. The multiple portions may be separated by gutters, gables, spacers, and/or conduits used to support the portions.

Figure 5:
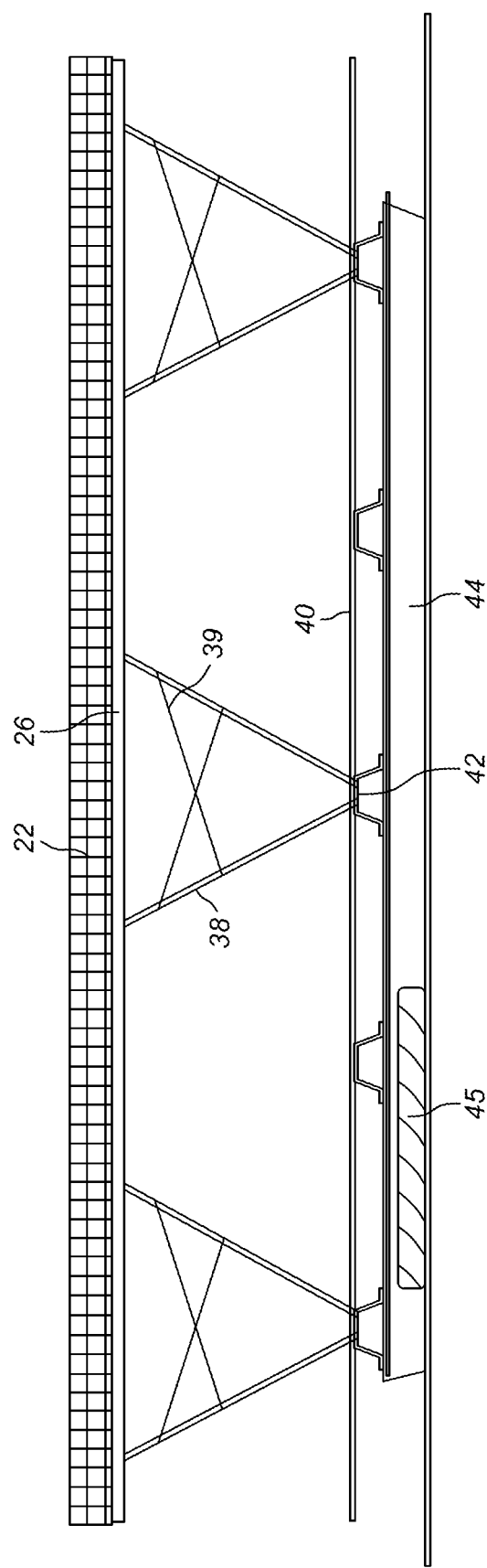
FIG. 5 illustrates the side view of the platform of FIG. 1, in accordance with aspects of this disclosure.

FIG. 5 illustrates the side view of the platform 20. As shown, the tables 20 are elevated a substantial height (e.g., 8-12 feet, or a height 20-25% of the length of the structure) from the ground surface and/or runners 44, which may limit access to the photovoltaic panels, gutters, cabling, etc. This serves to raise the photovoltaic panels away from obstructions (e.g., between the panels and the sun), as well as protecting components from vandals and/or livestock which may graze between platforms.

Figure 6:
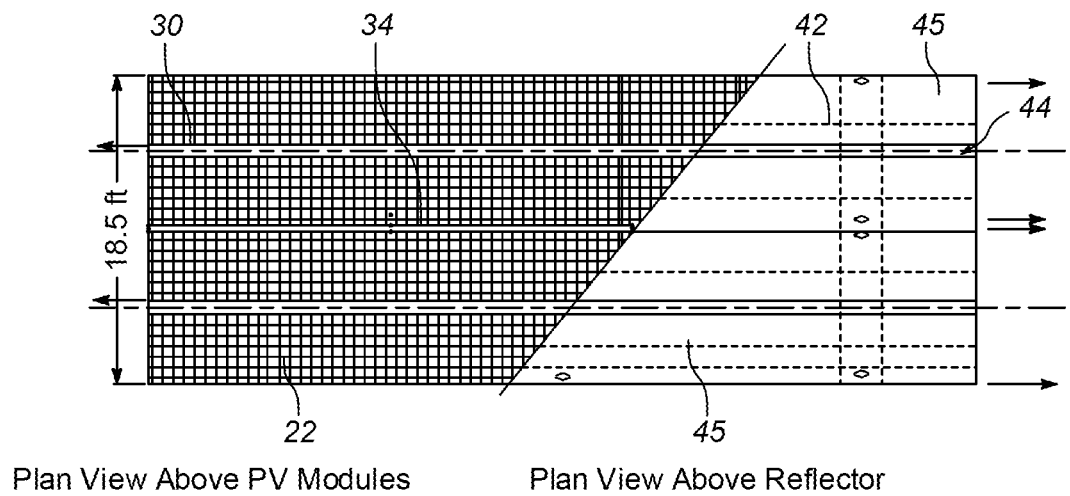
FIG. 6 illustrates plan views of the platform of FIG. 1, seen above and below the photovoltaic modules, in accordance with aspects of this disclosure.
Figure 7:
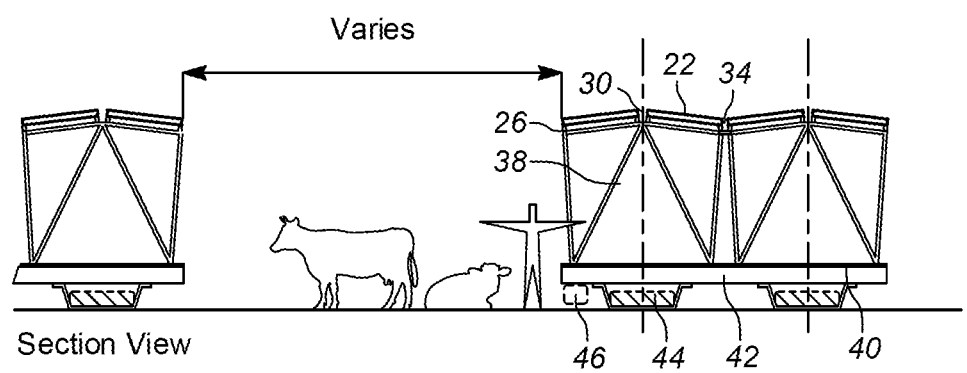
FIG. 7 illustrates a section view of the platform of FIG. 1, in accordance with aspects of this disclosure.
Figure 8:
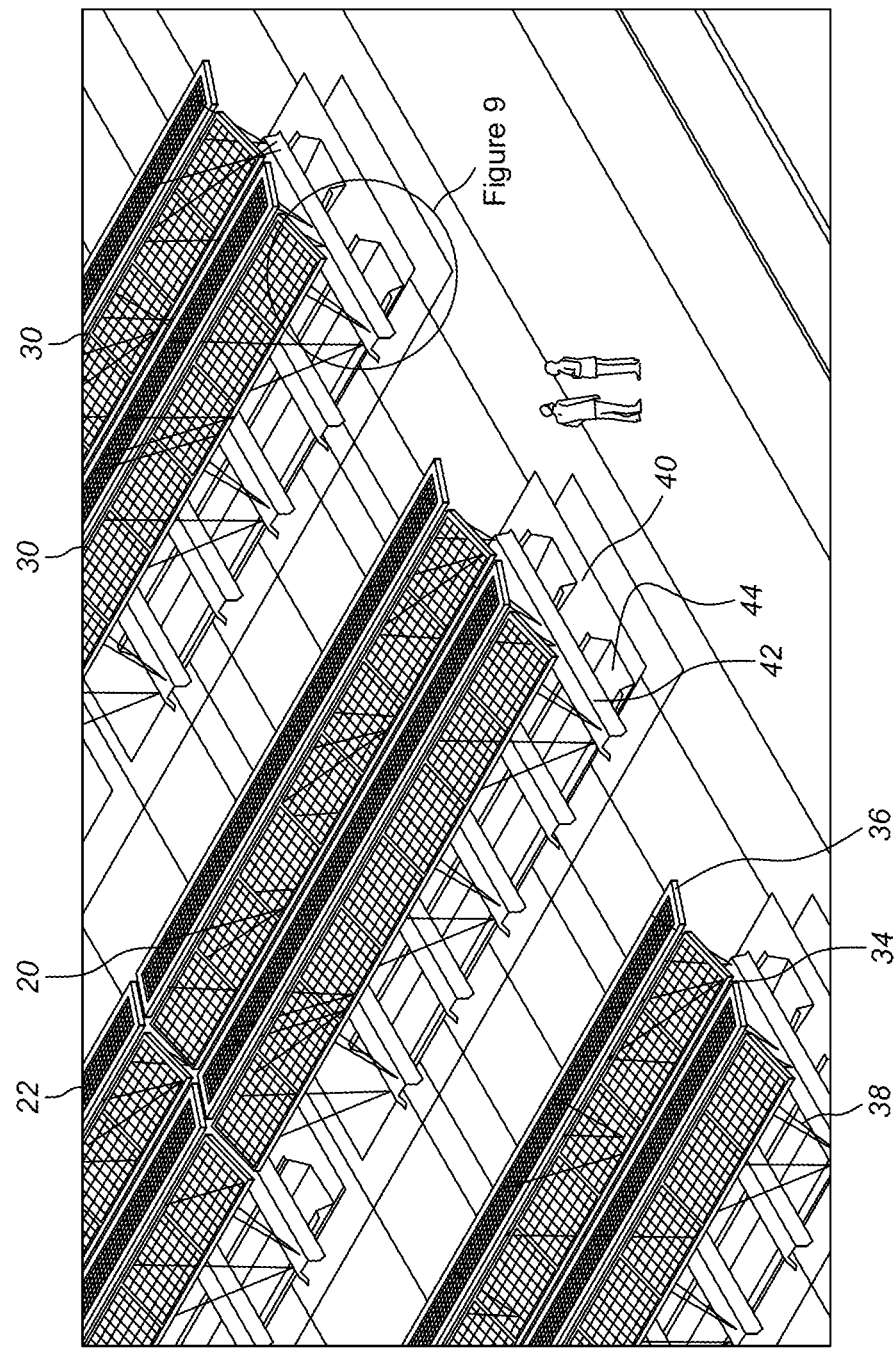
FIG. 8 illustrates an example of multiple platforms of FIG. 1, deployed in columns on working land, in accordance with the aspects of this disclosure.
Figure 9:
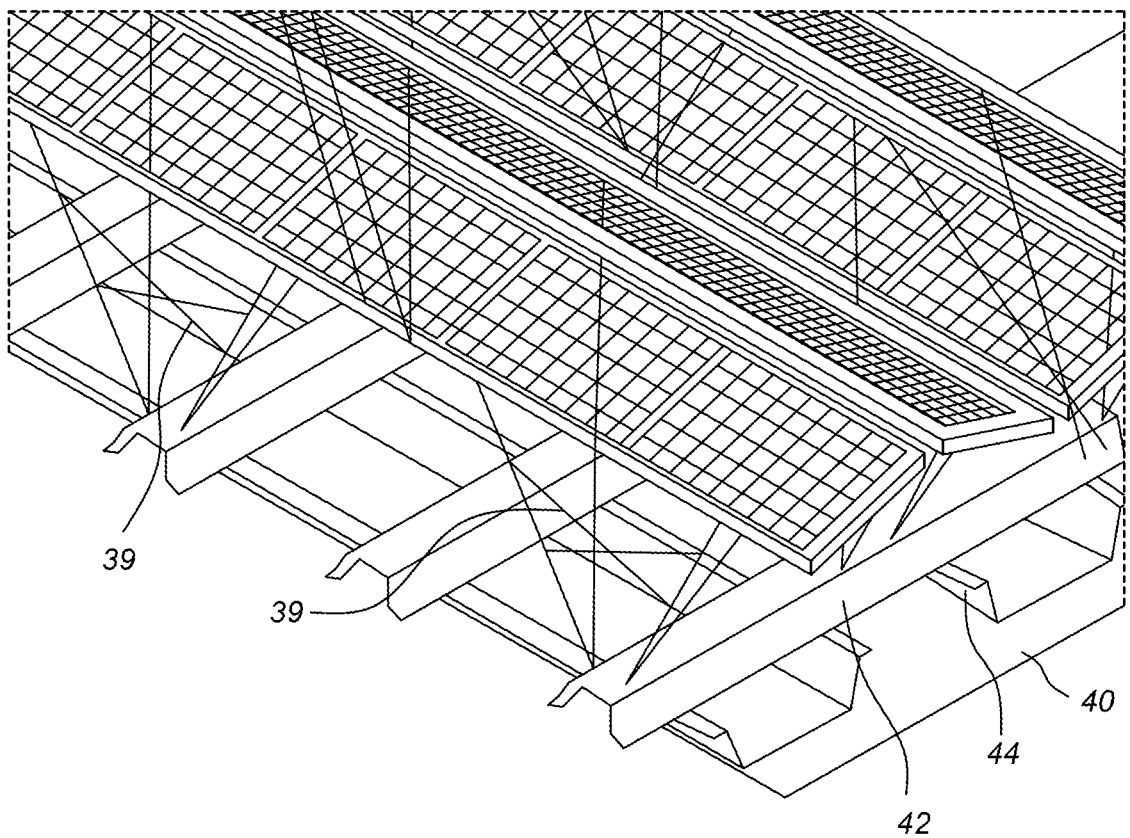
FIG. 9 illustrates a detailed isometric view of FIG. 8, in accordance with aspects of this disclosure.

FIG. 6 illustrates plan views of the platform 20, seen above and below the photovoltaic modules. FIG. 7 illustrates a section view of the platform 20, which typical figures of humans and/or cattle for relative size. Further, the reflection of rays of sunlight 41 from the reflectors 40 to the underside of the bifacial photovoltaic panels is illustrated. FIG. 8 illustrates an example of multiple platforms 20, deployed in columns on working land. FIG. 9 illustrates a detailed isometric view of the multiple platforms 20 provided in FIG. 8. FIGS. 8 and 9 are shown without a reflector for clarity.

Process

Figure 10:
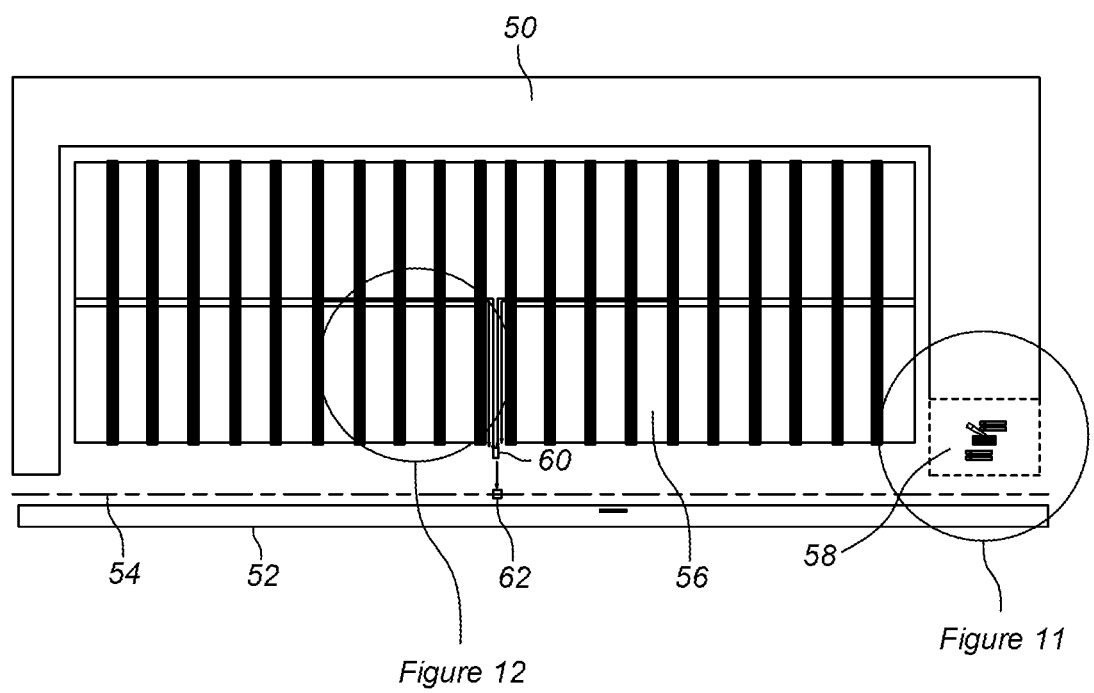
FIG. 10 illustrates the plan of a solar farm adjacent to an onsite staging area for repeated assembly of platforms, in accordance with aspects of this disclosure.

In one embodiment, the modular platforms described with respect to FIGS. 1 to 9 are configured to deploy on working lands, like agricultural farms, to create a solar farm. FIG. 10 illustrates an example of a solar farm paralleling a road 52 and overhead distribution power lines 54. Within a staging area 58, located proximate to the solar farm, platforms are assembled from components delivered on flatbed semitrailer trucks. In some examples, contractors can provide typical job site amenities and necessities such as power, shelter, and portable toilets at the periphery of the staging area, when needed.

Figure 11:
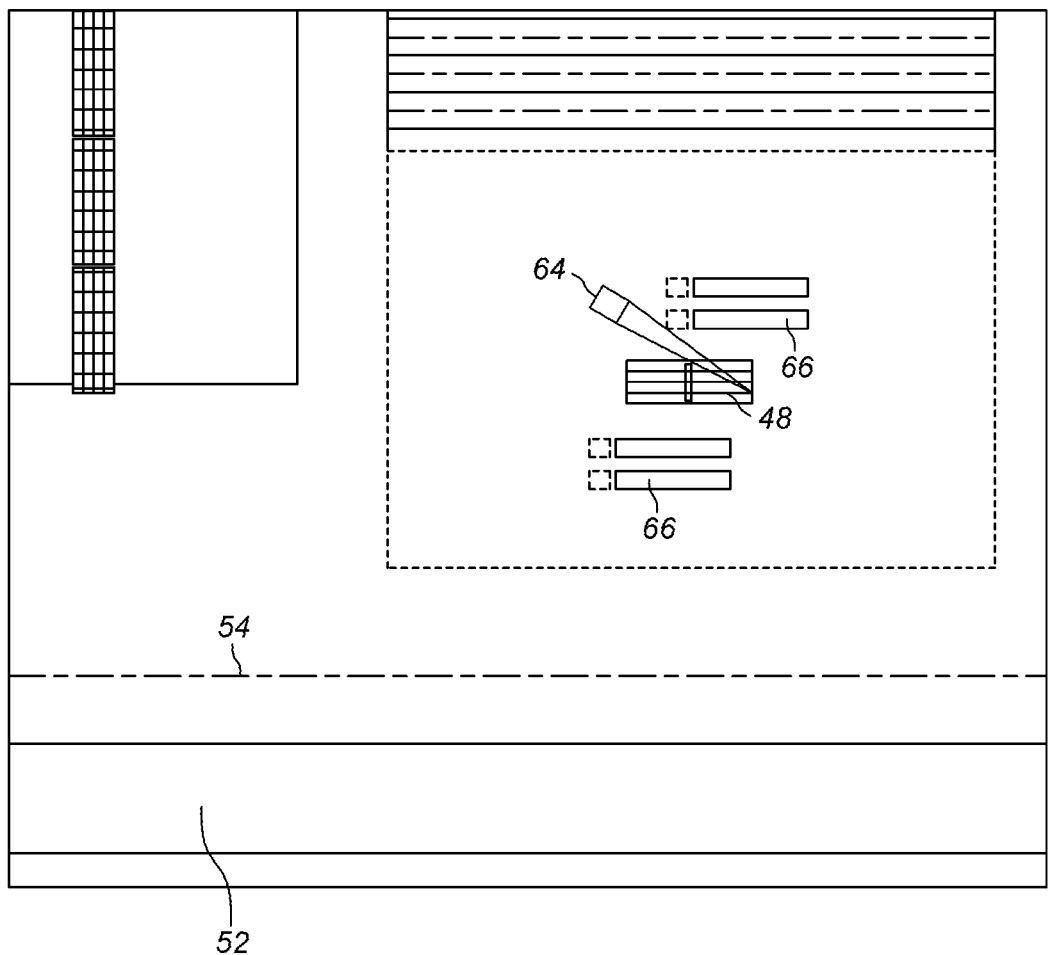
FIG. 11 illustrates a detailed plan of the staging area, in accordance with aspects of this disclosure.

As shown in FIG. 11, a crane 64 or other lifting machine is situated within reach of flatbed trailers 66 stocked with prefabricated components. The crane 64 lifts components to a location 48 where platforms are assembled on a level surface, such as a concrete slab or crane pads marked with reference points or jigged with guides. To assemble a platform, the crane 64 first lifts two runners 44 onto the level surface, registering to reference marks or guides. Next, crane 64 lifts the stretchers 42 into position, assisted, for example, by crew members aligning holes with drift pins. After holes align, the components are fastened and/or lock-bolted with mechanical, hydraulic and/or pneumatic tools.

With the stretchers 42 fastened, crane 64 will lift pairs of diagonal struts 38 onto the top of the stretchers, assisted, for example, by crewmembers aligning holes with drift pins. After holes align, the feet 38a are fastened and/or lock-bolted to the stretchers 42 with mechanical, hydraulic and/or pneumatic tools. As shown in FIG. 3, the diagonal struts 38 will rotate about the feet to achieve equilibrium under gravity, constrained by cable stays 39.

After all the feet 38a of the diagonal struts 38 are fastened to stretchers 42, crane 64 will lift prefabricated tables 22 into place using lifting lugs 28, for example, assisted by crews aligning guide holes with drift pins. After guide holes align, for example, crews will lockbolt the purlins 26 to the top of the diagonal strut frames 38 with mechanical, hydraulic and/or pneumatic tools and a spacer to account for erection tolerances. As pairs of tables 22 are secured, crews will install cable trays 30 between tables 22, for example.

In addition to providing energy, the modular assemblies can be used to house or support other systems. In some examples, if the landowner wants to collect rainwater, one or more gutters 34 are installed in the valley between gables, completing the assembly of the platform.

After attaching to the rigging points in runners 44, one or more working vehicles such as a tractor will tow the assembled platform into place on the solar farm. As illustrated in FIG. 10, the modular platforms can be arranged and/or spaced in columns and/or other spatial arrangements to create grazing paddocks 56 for livestock, creating a dual-use field or farm.

Figure 12:
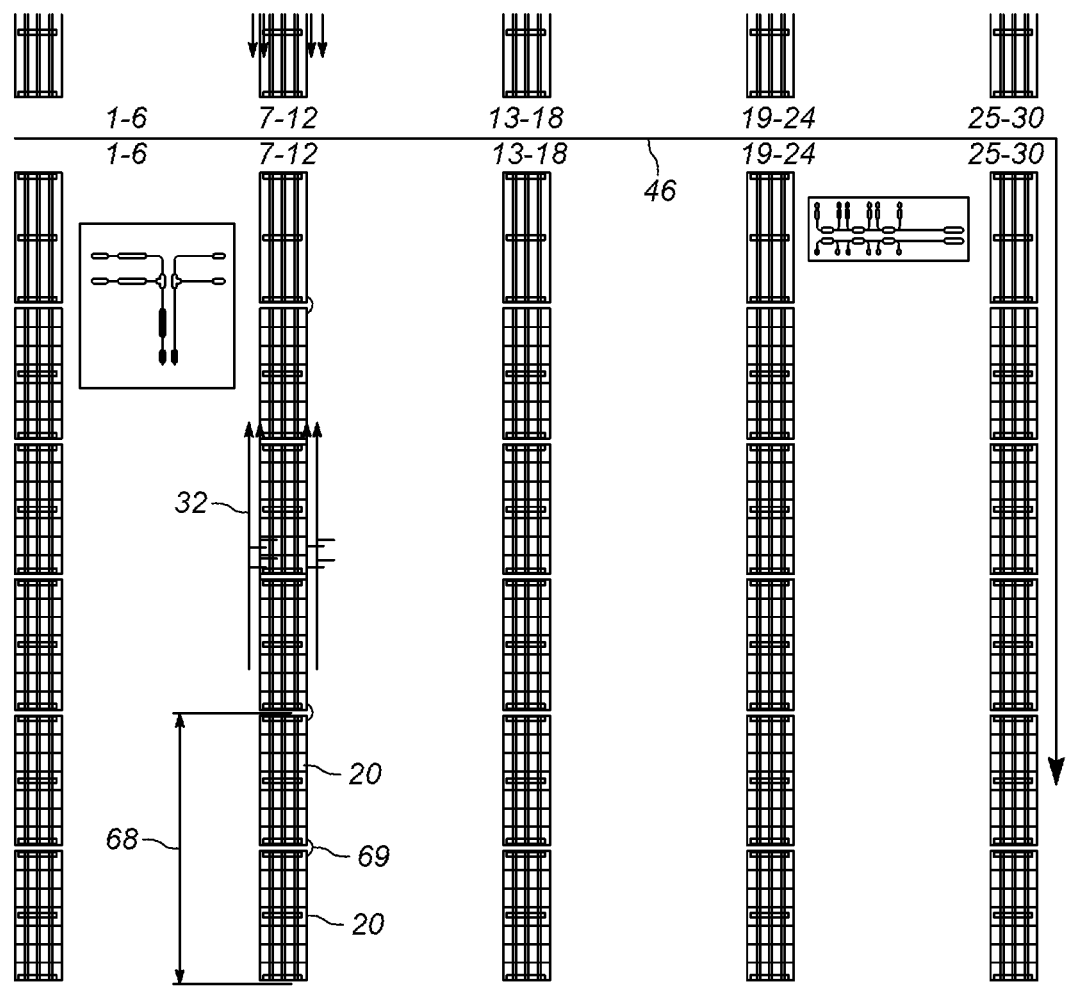
FIG. 12 illustrates a detailed plan of a column of platforms arranged in rows on a solar farm, in accordance with aspects of this disclosure.

After an entire column or arrangement of platforms is in place on the solar farm, electrical connections between platforms are made. In some examples, bonding jumpers 69 are connected to adjacent platforms. As shown in FIG. 12, tables 22 of multiple platforms 20 will comprise strings of photovoltaic modules 68. The loose factory cables are connected at the end of tables 22 (or other suitable locations) to adjacent or nearby cables, such as prefabricated fused string cables 32. The fused string cables 32 lay in the cable trays 30, routing them to connect with the fused array cables 46 at one or more connection points in a transverse aisle. The array cables 46 route within an integrally grounded cable management system connected to stretchers 42. The array cables 46 are configured to connect to the skid-mounted central inverter station 60.

As illustrated in FIG. 10, local utility crews can route a cable to the distribution grid interconnection 62. Alternatively or additionally, power can be routed directly to the private owner's facilities with a privately owned cable. For an agricultural landowner, the facilities could include hydrogen electrolyzers and ammonia generators that provide a diesel alternative and nitrogen fertilizer for carbon-free operations.

Figure 13:
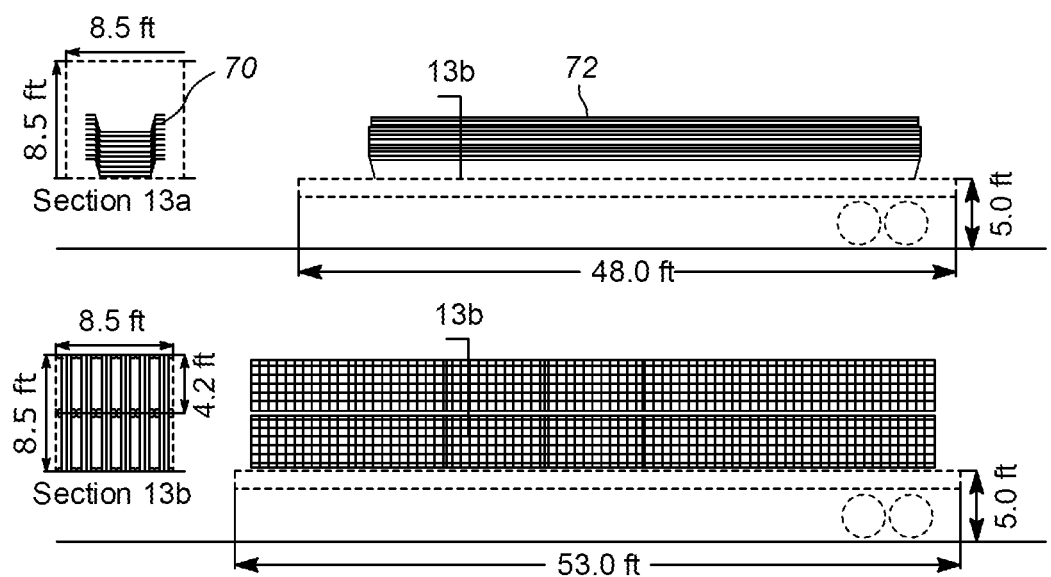
FIGS. 13 and 14 illustrate the shipping configurations of components delivered to the staging area on flatbed trailers, in accordance with aspects of this disclosure.

To maximize local economic benefits, platforms can be assembled onsite from locally fabricated components or prefabricated subassemblies. Long steel plate components, like runners 42, may employ a 50-foot press brake, which may be available regionally. Alternatively or additionally, the runners 42 can be fabricated from two zee-shaped steel piles welded at the seam. As illustrated in FIG. 13, runners 44 will ship nested on a flatbed, which may be constrained by weight limits, to minimize transportation volume. Tables 22 can be prefabricated locally from purchased bifacial photovoltaic modules 24 and custom fabricated steel purlins 26 and rake 36 members. Tables 22 can be tested for electric anomalies on both sides before shipping. As illustrated in FIG. 13, the tables are configured to nest during shipping to compact transportation volume.

Figure 14:
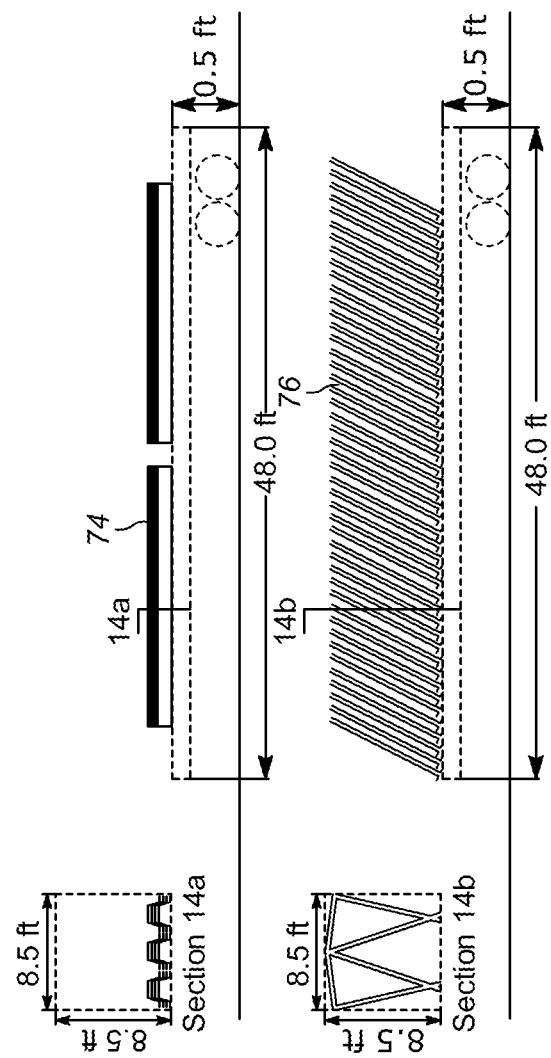

As illustrated in FIG. 14, stretchers 42 are configured to ship nested on flatbeds, which may be constrained by weight limits. Locally fabricated diagonal strut frames 38 may ship in pairs, racked on a flatbed trailer as shown in FIG. 14.

Logistics companies or other entities deliver components to the staging area just-in-time to minimize handling and warehousing costs.

Although described as being transported on semitrailers, any type of vehicle, including ground based, aerial and/or waterborne, may transport the described components. Although described as being assembled by crews, in some examples the components may be assembled by robotic and/or autonomous means. Although described as being located on fields and/or grazing land, an installation of modular panels may be transported to and assembled on any type of environment or terrain.

Conclusion

The pre-engineered modular platform components and hardware, fabrication process, and onsite assembly minimize the time and effort required to build solar farms on various types of land, including working lands. In the case of land-owning farmers and ranchers, they can own the means of producing food and fiber and the means of producing energy. Solar farms of the modular solar platforms can generate all the electricity farmers and ranchers need to produce carbon-free fuels (hydrogen, ammonia, or a combination) to dry grain and run their tractors, combines, semis, and/or other equipment. Additionally, farmers can use their locally generated energy to produce ammonia for nitrogen fertilizer.

For dual-use farming, unlike today's single-axis trackers, paddocks created by spacing columns of modular platforms can accommodate livestock larger than sheep, including cattle, to provide additional revenue. Further, the location of the solar installations on the land may be rotated or moved periodically.

Some farmers and ranchers can choose to export some of their energy to their Rural Electric Member Cooperatives at prices equal to or lower than wholesale prices for mutual benefit. With modular platform solar farms interconnected to roadside 13 kv distribution lines, Rural Electric Member Cooperatives (REMCs) can forestall costly conductor upgrades since the solar farms exist at load centers. Additionally, REMCs can dramatically reduce demand charges during grain drying season.

After a number of years (e.g., decades, 30 years, etc.), landowners can repower the modular platform chassis with new bifacial photovoltaic tables at an onsite staging area, dramatically reducing the cost of power for the next generation. If fabricators galvanize steel components and use corrosion-resistant lockbolts to provide the platform chassis with a long service life (e.g., 100-years or more), the modular platform can be repowered a second time.

When deploying modular platforms to create a solar farm, landowners do not have to pay a premium for a solar developer's sophisticated knowledge. On dramatically different types of working lands, farmers and ranchers can deploy the same modular platforms since they are agnostic to crop types, livestock size, topography, environmental and subsurface conditions.

Other types of owners can also leverage the modular platforms' characteristics to their benefit.

Farmers raising livestock like hogs and chickens in enclosed barns can use modular platforms to power systems critical to animal well-being, including lighting and ventilation, without relying on a distribution grid. Similarly, farmers growing produce in greenhouses can use modular platforms to power systems for ventilation and hydroponics. Similar to traditional farmers, both types of farmers can size their solar farms to generate enough hydrogen and ammonia to run their operations carbon-free, continuously, year-round.

Owners who operate in remote areas without an electric distribution grid can use pre-engineered modular platforms to generate electricity, too. A farmer operating off-grid needing to water crops can use multiple modular platforms to produce electricity to power pivot irrigation pumps and motors, obviating the need to transport fuel. Ranchers grazing livestock on remote rangelands can use modular platforms to generate electricity for seasonal camps, relocating them annually.

Agencies responding to emergencies can rapidly deploy modular platforms to create temporary solar farms for generating off-grid power. Agencies can stock flatbed trailers with components in regional centers to minimize response times.

Owners with tracts of land unsuitable for permanent foundations can use modular platforms to generate electricity. Owners of capped landfills can use modular platforms to generate renewable energy on ground that otherwise would remain unproductive. Owners of land above underground water storage tanks, including those required to store emergency reserves, can use modular platforms to generate renewable energy on the ground above if the tanks can support the superimposed load. In some examples, owners omitting or modifying the reflector (e.g., creating holes therein, adjusting the amount of reflectivity of the reflector, etc.) can use the hollow of the tub girder runners as planting troughs to grow agricultural products under the bifacial photovoltaic modules, even on brownfields.

Owners of tracts of land unsuitable for development in highway and airport right-of-ways can also use modular platforms to generate renewable energy to support transportation needs.

Rural electric member cooperatives and municipal electric utilities can build solar farms using modular platforms on public land or land leased from members to generate local energy economic benefits. Additionally, community organizations, including Community Choice Aggregation organizations, can use modular platforms to generate local energy on land leased to improve distributional or procedural equity within the community.

The present method and/or system may be realized in hardware, software, or a combination of hardware and software. The present methods and/or systems may be realized in a centralized fashion in at least one computing system, or in a distributed fashion where different elements are spread across several interconnected computing or cloud systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

In disclosed examples, a modular platform for deployable solar installations includes one or more bifacial photovoltaic modules; one or more tables to support the bifacial photovoltaic modules; one or more reflectors; and a base configured to support the one or more reflectors at a first position proximate a ground surface, and to support the one or more tables at an elevated second position relative to the first position of the one or more reflectors.

In some examples, the base comprises one or more runners configured to stabilize the modular platform. In examples, the one or more runners comprise an angled end portion to allow the base to be dragged over unimproved surfaces.

In some examples, the base comprises a ballast configured to be filled by a material sufficient to anchor the modular platform.

In some examples, the one or more tables comprises a first table and a second table, the first table arranged at an angle relative to the second table.

In some examples, a position or orientation of the modular platform, the first table, and the second table are fixed relative to the ground surface.

In some examples, the modular platform is a first modular platform arranged adjacent to a second modular platform, the one or more bifacial photovoltaic modules of the first modular platform configured to be electrically connected to the one or more bifacial photovoltaic modules of the second modular platform. In examples, the first modular platform and the second modular platform are arranged in a column. In examples, the one or more bifacial photovoltaic modules of both the first and second modular platforms are configured to be electrically connected to a power grid via a grid interconnection.

In some examples, one or more gutters are arranged at an edge of the one or more bifacial photovoltaic modules or the one or more tables to channel water from the modular platform.

In some examples, one or more cable trays support one or more electrical cables and arranged at an edge or end of the one or more bifacial photovoltaic modules or the one or more tables.

In some examples, a distance between the one or more bifacial photovoltaic modules and the one or more reflectors is at least 1 meter.

In some disclosed examples, a modular platform for deployable solar installations includes one or more bifacial photovoltaic modules; one or more reflectors; a base configured to support the one or more reflectors at a first position proximate a ground surface, and to support the one or more bifacial photovoltaic modules at an elevated second position relative to the first position of the one or more reflectors; and a ballast connected to the base and configured to be filled by a material sufficient to anchor the modular platform.

In some examples, one or more tables support the one or more bifacial photovoltaic modules. In examples, a frame supports the one or more tables or the one or more bifacial photovoltaic modules. In examples, the one or more tables are mounted to the base via the frame, the one or more tables comprising a first table and a second table, the first table arranged at an angle relative to the second table. In examples, the frame comprises one or more diagonal struts, wherein two or more of the one or more diagonal struts extend to the one or more tables or the one or more bifacial photovoltaic modules from a common contact point at the base.

In some examples, the one or more reflectors are arranged on the base to reflect light incident on the one or more reflectors toward a first downward facing photovoltaic surface of the one or more bifacial photovoltaic modules.

In some examples, the one or more bifacial photovoltaic modules comprises a second upward facing photovoltaic surface.

In some examples, the ground surface is substantially level ground.

As used herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

As utilized herein, the terms "e.g.," and "for example" set off lists of one or more non-limiting examples, instances, or illustrations.

What is claimed is:

1. A modular system for deployable solar installations, the system comprising:
    one or more photovoltaic modules;
    an upper portion configured to support the one or more photovoltaic modules;
    a base portion configured to be disposed adjacent to a ground surface in an assembled and installed state of the system; and
    a middle portion comprising a plurality of struts that extend between the base portion and upper portion, the middle portion being configured to support the upper portion at a height of at least 8 feet above the ground surface in the assembled and installed state;
    wherein, in the assembled and installed state:
        the base portion comprises:
            a first set of members, the first set of members running in a first direction relative to the ground surface and parallel to a plane of the ground surface; and
            a second set of members, the second set of members running in a second direction relative to the ground surface that is transverse to the first direction and parallel to the plane of the ground surface, the second set of members being disposed on top of one or more of the first set of members;
        one or more of the plurality of struts of the middle portion are affixed to one or more of the second set of members and extend upwardly toward the upper portion; and
        the system comprises rigging points configured to be coupled to a vehicle, such that the system is configured to be towed by a vehicle, while assembled, across the ground surface to a deployment area of the ground surface, and wherein the first set of members is a first set of tub girders having a trapezoidal cross-section with an open face, the open faces of the first set of members facing upward and open faces of the second set of members facing downward in the assembled and installed state.

2. The modular system of claim 1, wherein the first set of members comprises an angled end portion to allow the base portion to be dragged over unimproved surfaces.

3. The modular system of claim 1, further comprising one or more tables to support the bifacial photovoltaic modules, wherein the one or more tables comprises a first table and a second table, the first table arranged at an angle relative to the second table.

4. The modular system of claim 3, wherein the one or more tables is mounted on two diagonal struts of the middle portion.

5. The modular system of claim 1, wherein the modular system comprises a first modular platform including the one or more photovoltaic modules, the base portion, middle portion, and upper portion, the first modular platform being arranged adjacent to a second modular platform, the one or more photovoltaic modules of the first modular platform configured to be electrically connected to one or more photovoltaic modules of the second modular platform.

6. The system of claim 1, further wherein:
    the one or more photovoltaic modules are bifacial and have both an upward-facing electricity generating surface and a downward-facing electricity generating surface in the assembled installed state; and
    the base portion comprises one or more reflecting panels, the reflecting panels being configured to reflect light upward a distance of at least 1 meter from the reflecting panels at the base portion to the downward-facing electricity generating surface of the one or more photovoltaic modules.

7. The system of claim 6, wherein at least one of the reflecting panels is disposed on a top surface of one or more of the first set of members and the second set of members of the base portion.

8. The system of claim 1, wherein a ballast is disposed within one or more of the opens face of the first set of tub girders.

9. A method for installing a deployable solar apparatus, the method comprising:
    disposing the deployable solar apparatus in an assembled state in a field, the deployable solar apparatus comprising:
        an upper portion configured to support one or more photovoltaic modules;
        a base portion configured to be disposed adjacent to a ground surface in the assembled state; and
        a middle portion comprising a plurality of struts that extend between the base portion and upper portion, the middle portion being configured to support the upper portion at a height of at least 8 feet above the ground surface in the assembled state;

wherein:
  the base portion comprises:
    a first set of members, the first set of members running in a first direction relative to the ground surface and parallel to a plane of the ground surface; and
    a second set of members, the second set of members running in a second direction relative to the ground surface that is transverse to the first direction and parallel to the plane of the ground surface, the second set of members being disposed on top of one or more of the first set of members; and
  one or more of the plurality of struts of the middle portion are affixed to one or more of the second set of members and extend upwardly toward the upper portion, and wherein the first set of members is a first set of tub girders having a trapezoidal cross-section with an open face, the open faces of the first set of members facing upward and open faces of the second set of members facing downward in the assembled and installed state;
  attaching one or more rigging points of the apparatus to a vehicle; and
  using the vehicle, dragging the apparatus in the assembled state across a ground surface of the field to a deployment area.

10. The method of claim 9, wherein the first set of members comprise an angled end portion configured to facilitate dragging the apparatus across the ground surface.

11. The method of claim 9, wherein the apparatus further comprises one or more tables to support the bifacial photovoltaic modules, the one or more tables comprising a first table and a second table, the first table being arranged at an angle relative to the second table.

12. The method of claim 11, wherein the one or more tables is mounted on two diagonal struts of the middle portion.

13. The method of claim 9, wherein the apparatus comprises a first modular platform including the one or more photovoltaic modules, the base portion, middle portion, and upper portion; and
  dragging the apparatus to the deployment area comprises placing the first modular platform arranged adjacent to a second modular platform and electrically connecting the one or more photovoltaic modules of the first modular platform to one or more photovoltaic modules of the second modular platform.

14. The method of claim 9, further wherein:
  the one or more photovoltaic modules are bifacial and have both an upward-facing electricity generating surface and a downward-facing electricity generating surface in the assembled state; and
  the base portion comprises one or more reflecting panels, the reflecting panels being configured to reflect light upward a distance of at least 1 meter from the reflecting panels at the base portion to the downward-facing electricity generating surface of the one or more photovoltaic modules.

15. The method of claim 14, wherein at least one of the reflecting panels is disposed on a top surface of one or more of the first set of members and the second set of members of the base portion.

16. The method of claim 9, wherein a ballast is disposed within one or more of the opens face of the first set of tub girders.

* * * * *